(12) United States Patent
Guo et al.

(10) Patent No.: US 12,265,369 B2
(45) Date of Patent: Apr. 1, 2025

(54) COMPUTER-IMPLEMENTED METHOD OF CONTROLLING A MANUFACTURING MACHINE, ASSOCIATED SYSTEM AND COMPUTER READABLE INSTRUCTIONS

(71) Applicant: PRATT & WHITNEY CANADA CORP., Longueuil (CA)

(72) Inventors: Changsheng Guo, Longueuil (CA); Clément Drouin Laberge, Longueuil (CA); Rachid Guiassa, Longueuil (CA); Denis Hardy, Longueuil (CA); Philippe Melancon, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 565 days.

(21) Appl. No.: 17/533,220

(22) Filed: Nov. 23, 2021

(65) Prior Publication Data

US 2023/0161314 A1 May 25, 2023

(51) Int. Cl.
*G05B 19/18* (2006.01)

(52) U.S. Cl.
CPC .. *G05B 19/182* (2013.01); *G05B 2219/35043* (2013.01)

(58) Field of Classification Search
CPC ........ G05B 19/182; G05B 2219/35043; G05B 19/41875; G05B 2219/31282; G05B 2219/31323; G05B 2219/31427; G05B 19/4183; G06Q 10/0631; G06Q 50/04; Y02P 90/02
USPC ................................................... 700/160, 98
See application file for complete search history.

(56) References Cited

U.S. PATENT DOCUMENTS

| | | |
|---|---|---|
| 10,466,681 B1 | 11/2019 | Jones et al. |
| 10,817,526 B2 | 10/2020 | Jones et al. |
| 10,831,179 B2 | 11/2020 | Byers et al. |
| 10,871,764 B2 | 12/2020 | Nordell et al. |
| 11,507,052 B2 | 11/2022 | Sykes et al. |
| 2004/0143362 A1* | 7/2004 | Matthews .......... G05B 19/4097 700/182 |
| 2005/0085940 A1* | 4/2005 | Griggs ................. G05B 19/401 700/181 |

(Continued)

FOREIGN PATENT DOCUMENTS

| | | | |
|---|---|---|---|
| CN | 102629287 | | 8/2012 |
| CN | 105867305 A | * | 8/2016 |

(Continued)

*Primary Examiner* — Thomas C Lee
*Assistant Examiner* — Michael Tang
(74) *Attorney, Agent, or Firm* — Norton Rose Fulbright Canada LLP (57) ABSTRACT

The method can include at a controller, controlling a manufacturing machine to perform a manufacturing process step for a given feature of a plurality of features of a part, including executing instructions causing the manufacturing machine to perform the manufacturing process step, the instructions comprising an identifier of the given feature and a definition of the manufacturing process step to be executed in relation to the given feature; at the controller, during the manufacturing process step, generating manufacturing data from the manufacturing process step; and by the controller, associating the manufacturing data to the identifier of the given feature in a non-transitory memory.

10 Claims, 10 Drawing Sheets

(56) References Cited

U.S. PATENT DOCUMENTS

| | | | | |
|---|---|---|---|---|
| 2016/0070253 A1* | 3/2016 | Dunkin | ............... | B23B 41/16 |
| | | | | 408/1 R |
| 2018/0085877 A1 | 3/2018 | Agudelo | | |
| 2018/0085878 A1* | 3/2018 | Agudelo | ............ | B23Q 17/0995 |
| 2018/0259935 A1* | 9/2018 | Saitou | ................ | G05B 19/4097 |
| 2022/0121183 A1* | 4/2022 | Kuhn | ....................... | G06N 3/08 |

FOREIGN PATENT DOCUMENTS

| | | |
|---|---|---|
| TN | 2016000266 | 10/2017 |
| WO | 2018089252 | 5/2018 |
| WO | WO-2018204410 A1 * | 11/2018 |

* cited by examiner

FIG. 1

```
N133   ; ATTENTION: FOLLOWING LINES DEFINED BY INSERT STATEMENT.
N134   ;VERICUT-MODAL FASTFEED 5.0
N135   ;VERICUT-MODAL FASTFPR .008
N136   ; ATTENTION: END OF INSERTED LINES
N137   ANTI_VIBR_ON(10,2.5000)
N138   M300
; ROUGH CORNER
N139   G96 M2=3 S2=600
N140   LIMS=800
N141   M1=18
N142   G94 G1 X16. Y0 Z-10.8138 F400. M7
N143   Z-6
N144   Z-1.3134
N145   X15.4936
N146   MONITOR_CUT_1(FAST-123-12) or other feature ID
N147   G96 X15.4228 Z-1.2771 F.004
N148   Z15.3364 Z-1.2339 F.0015
N149   Z15.3436 Z-1.2374 F.006
N150   ; ATTENTION: FOLLOWING LINES DEFINED BY INSERT STATEMENT.
N151   MONITOR_CUT_0 (FAS-123-12)
N152   ; ATTENTION: END OF INSERTED LINES
N153   G94 X16. F400.
N154   Z-1.75
; ROUGH CORNER
N155   G94 Z-2.
N156   Z-3.5637
N157   X8.8746
```

FIG. 7

| Sequence ID | FASID | is KPC | Measuring Date | Measure | P01 | P02 | P03 | P13 | P14 | P15 | P16 | P17 |
|---|---|---|---|---|---|---|---|---|---|---|---|---|
| 23RGH | 3.5.1-DIA | 0 | 2020-01-13 01:07:13 | -8.895 | -0.00005 | 8.89495 | 0 | 0 | RMP600 | 30G5701 | | LKLBE87809 |
| 23RGH | 3.5.1-DIA | 0 | 2020-01-13 01:08:30 | -10.1798 | -0.00005 | 10.17975 | 0 | 0 | RMP600 | 30G5701 | | LKLBE87809 |
| | 3.5.1-DIA | 23 | 2020-01-13 05:45:07 | 8.895 | 8.89563 | 0.00063 | 1.2565 | 8.89563 | SPRINT | 30G5701 | | LKLBE87809 |
| | 3.6.1-DIA | 21 | 2020-01-13 05:47:43 | 10.1798 | 10.17971 | -0.00009 | 1.24 | 10.17971 | SPRINT | 30G5701 | | LKLBE87809 |
| 23RGH | 3.5.1-DIA | 0 | 2020-03-11 18:44:41 | 8.895 | 0.00018 | -8.89482 | 0 | 0 | RMP600 | 30G5701 | | LKLBFB9359 |
| 23RGH | 3.5.1-DIA | 0 | 2020-03-11 18:45:57 | 10.1798 | 0.00018 | -10.17962 | 0 | 0 | RMP600 | 30G5701 | | LKLBFB9359 |
| | 3.5.1-DIA | 23 | 2020-03-11 20:15:44 | 8.895 | 8.89549 | 0.00049 | 1.2565 | 8.89549 | SPRINT | 30G5701 | | LKLBFB9359 |
| | 3.6.1-DIA | 21 | 2020-03-11 20:18:16 | 10.1798 | 10.17955 | -0.00025 | 1.24 | 10.17955 | SPRINT | 30G5701 | | LKLBFB9359 |
| 23RGH | 3.5.1-DIA | 0 | 2020-03-14 21:23:20 | -8.895 | -0.00002 | 8.89498 | 0 | 0 | RMP600 | 30G5701 | | LKLBFB9370 |
| 23RGH | 3.5.1-DIA | 0 | 2020-03-14 21:24:37 | -10.1798 | -0.00002 | 10.17978 | 0 | 0 | RMP600 | 30G5701 | | LKLBFB9370 |
| | 3.5.1-DIA | 23 | 2020-03-15 01:30:59 | 8.895 | 8.89589 | 0.00089 | 1.2565 | 8.89589 | SPRINT | 30G5701 | | LKLBFB9370 |
| | 3.6.1-DIA | 21 | 2020-03-15 01:33:31 | 10.1798 | 10.17987 | 0.00007 | 1.24 | 10.17987 | SPRINT | 30G5701 | | LKLBFB9370 |
| 23RGH | 3.5.1-DIA | 0 | 2020-03-14 10:44:52 | 8.895 | 0.0003 | -8.8947 | 0 | 0 | RMP600 | 30G5701 | | LKLBFB9369 |
| 23RGH | 3.5.1-DIA | 0 | 2020-03-14 10:46:09 | 10.1798 | 0.0003 | -10.1795 | 0 | 0 | RMP600 | 30G5701 | | LKLBFB9369 |
| | 3.5.1-DIA | 23 | 2020-03-14 12:27:52 | 8.895 | 8.8956 | 0.0006 | 1.2565 | 8.8956 | SPRINT | 30G5701 | | LKLBFB9369 |
| | 3.6.1-DIA | 21 | 2020-03-14 12:30:27 | 10.1798 | 10.17949 | -0.00031 | 1.24 | 10.17949 | SPRINT | 30G5701 | | LKLBFB9369 |
| 23RGH | 3.5.1-DIA | 0 | 2020-03-24 12:47:48 | 8.895 | 0.00013 | -8.89487 | 0 | 0 | RMP600 | 30G5701 | | LKLBFB9383 |
| 23RGH | 3.5.1-DIA | 0 | 2020-03-24 12:49:05 | 10.1798 | 0.00013 | -10.17967 | 0 | 0 | RMP600 | 30G5701 | | LKLBFB9383 |
| | 3.5.1-DIA | 23 | 2020-03-24 15:33:52 | 8.895 | 8.89651 | 0.00151 | 1.2565 | 8.89651 | SPRINT | 30G5701 | | LKLBFB9383 |
| | 3.6.1-DIA | 21 | 2020-03-24 15:37:16 | 10.1798 | 10.17952 | -0.00028 | 1.24 | 10.17952 | SPRINT | 30G5701 | | LKLBFB9383 |
| 23RGH | 3.5.1-DIA | 0 | 2020-05-08 18:32:56 | 8.895 | 0.00005 | -8.89495 | 0 | 0 | RMP600 | 30G5701 | | LKLBFL9193 |
| 23RGH | 3.5.1-DIA | 0 | 2020-05-08 18:34:07 | 10.1798 | 0.00005 | -10.17975 | 0 | 0 | RMP600 | 30G5701 | | LKLBFL9193 |
| | 3.5.1-DIA | 23 | 2020-05-08 19:59:31 | 8.895 | 8.89557 | 0.00057 | 1.2565 | 8.89557 | SPRINT | 30G5701 | | LKLBFL9193 |

```
*CTM-Data KN1 PN2933 TNY106 DN1106 DN1 BN11 txt - Notepad
File Edit Format View Help
[1492]
FAS 1.12.123-DIA      ← 58
Recorder number 26866
Date/Time    23.10.2017 05:24:28
Time    Process    Curve
([129])  ([100])
-1.00     0.22
-0.99     0.22
-0.98     0.22
-0.97     0.22
-0.96     0.22
-0.95     0.22
-0.94     0.22
-0.93     0.22
-0.92     0.22
-0.91     0.22
-0.90     0.22
-0.89     0.22
-0.88     0.22
-0.87     0.22
-0.86     0.22
-0.85     0.22
-0.84     0.29
```

FIG-10

COMPUTER-IMPLEMENTED METHOD OF CONTROLLING A MANUFACTURING MACHINE, ASSOCIATED SYSTEM AND COMPUTER READABLE INSTRUCTIONS

TECHNICAL FIELD

The application relates generally to manufacturing processes and, more particularly, to the collection, storage and retrieval of manufacturing data.

BACKGROUND OF THE ART

The design of complex systems such as gas turbine engines involves the design of individual parts. At the design stage, designers make design choices, such as evaluating manufacturing options or determining tolerances, based on information made available to them. A number of "as designed" part definitions can then make their way to a production management stage in which production managers can seek to optimize production also based on information made available to them. The production manager tasks can include production planning, and can also include the determination of inspection schedules. Inspection schedules can be defined in a manner to reduce the inspection burden while respecting quality criteria, and information such as inspection results of previously produced identical parts can be useful in achieving these objectives. It will be understood that the more structured information is practically made available to designers or to production managers, the more instrumented they are to extract knowledge out of it and take good decisions. Information about manufacturing processes can be relevant for other persons involved in the design, production or sales of parts and systems. While former techniques of collecting, communicating and/or retrieving information were satisfactory to a certain degree, there always remains room for improvement.

SUMMARY

In one aspect, there is provided a computer-implemented method of controlling a manufacturing machine, the method comprising: at a controller, controlling a manufacturing machine to perform a manufacturing process step for a given feature of a plurality of features of a part, including executing instructions causing the manufacturing machine to perform the manufacturing process step, the instructions comprising an identifier of the given feature and a definition of the manufacturing process step to be executed in relation to the given feature; at a controller during the manufacturing process step, generating manufacturing data from the manufacturing process step; and by the controller, associating the manufacturing data to the identifier of the given feature in a non-transitory memory.

In accordance with another aspect, there is provided a computer-implemented method of manufacturing a part, the method comprising: controlling a tooling subsystem of a manufacturing machine to perform a manufacturing process step for a feature of the part in accordance with instructions, an identifier of the feature being associated to a definition of the manufacturing process step in the instructions; providing manufacturing data pertaining to the manufacturing process step; and storing the manufacturing data with the identifier of the feature in a database.

In another aspect, there is provided a manufacturing machine having a tooling subsystem and a computer configured to control the tooling subsystem, the computer having a processor and a memory accessible to the processor, the memory having stored thereon instructions operable to, when executed by the processor: control the tooling subsystem to perform a manufacturing process step for a feature of the part, an identifier of the feature of the part being associated to a definition of the manufacturing process step in the instructions; and store manufacturing data pertaining to the manufacturing process step and the identifier of the feature of the part in fields of a single data item.

In a further aspect, there is provided a computer software product stored in a non-volatile memory and having instructions operable to, when executed by the processor: control a tooling subsystem to perform a manufacturing process step for a feature of the part, an identifier of the feature of the part being associated to a definition of the manufacturing process step in the instructions; store manufacturing data pertaining to the manufacturing process step and the identifier of the feature of the part in fields of a single data item.

In accordance with another aspect, there is provided a computer-implemented method of generating a database for manufacturing data pertaining to process steps performed on corresponding ones of a plurality of features of a plurality of parts, the method comprising: receiving, from a manufacturing machine, manufacturing data pertaining to a given process steps performed in relation with a given feature of a plurality of features of a part, and an identifier of the given feature; and associating the manufacturing data to the identifier of the given feature in a non-transitory memory.

DESCRIPTION OF THE DRAWINGS

Reference is now made to the accompanying figures in which:

FIG. 8 is an example of a data item in accordance with an embodiment;

DETAILED DESCRIPTION

Figure 1:
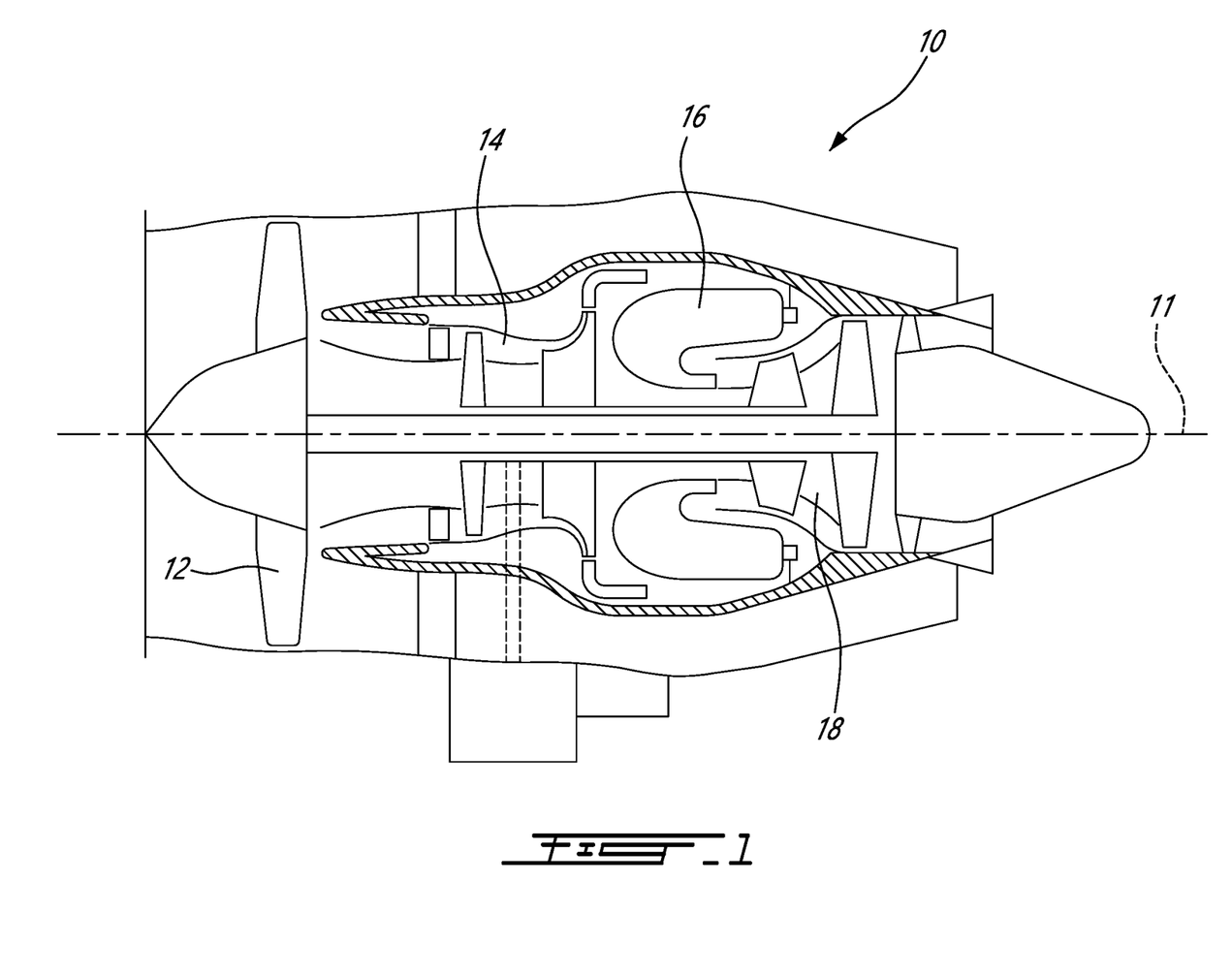
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor section 16 in which the compressed air is mixed with fuel and ignited for generating an annular stream of hot combustion gases around the engine axis 11, and a turbine section 18 for extracting energy from the combustion gases.

A complex system such as a gas turbine engine can have a large number of parts, the manufacture of which can involve a sequence of manufacturing process steps. Manufacturing process steps can be associated to a variety of manufacturing processes such as casting, 3D printing, machining, and inspection, and a sequence can include a plurality of same and/or different processes (e.g. rough machining followed by finishing machining and then inspection, or casting followed by machining). Some, or all of these process steps can be automated with one or more machine such as Computer Numerical Control (CNC) machining and Coordinate-Measuring Machine (CMM) inspection.

Figure 2A:
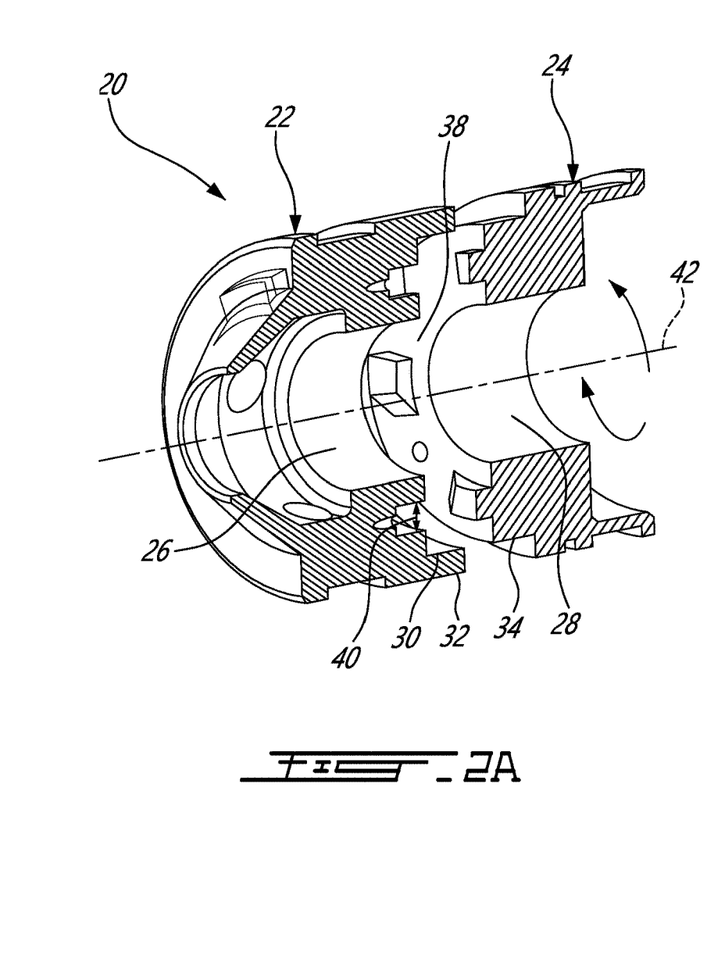
FIGS. 2A and 2B are oblique views taken from different angles of a gas turbine engine fuel nozzle assembly including two parts.
Figure 2B:
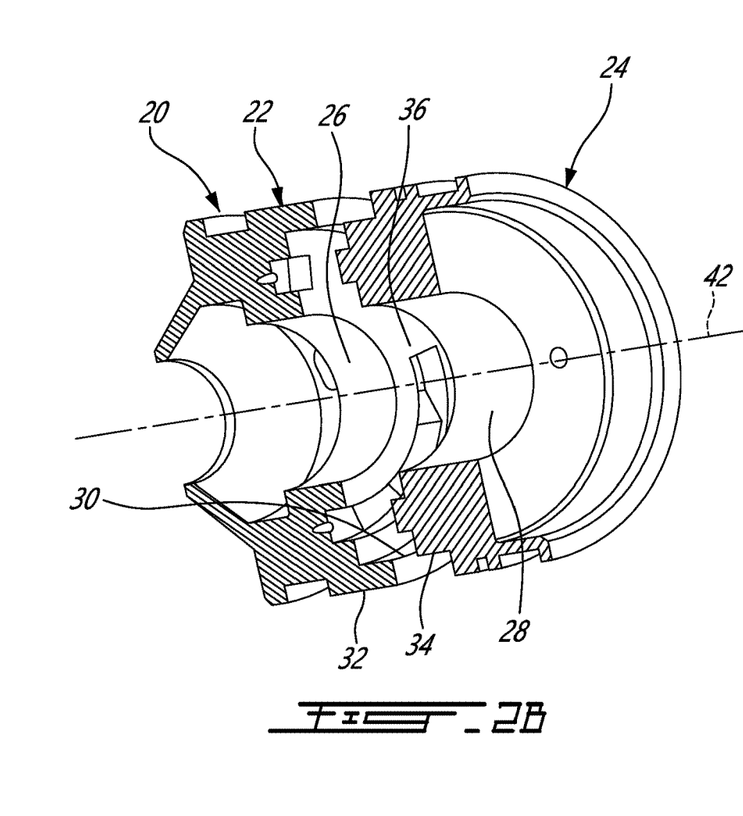

FIGS. 2A and 2B presents an example gas turbine engine assembly 20 which includes two parts 22, 24. In this example, the assembly is a fuel nozzle assembly 20 which is designed in a manner to be formed by the relatively close fitting of a first fuel nozzle part 22 and of a second fuel nozzle part 24. A plurality of such fuel nozzle assemblies 20 can ultimately be used in a circumferentially distributed manner in the combustor section 16 of a gas turbine engine. Innumerable alternate examples of parts can exist and this specific example is used here arbitrarily, simply to assist in giving a clear explanation of concepts involved in this disclosure. In this specific example, these two parts 22, 24 can be designed for machining from a cylindrical bar of titanium or aluminum using one or two subsequent CNC machining stations for instance. Such parts 22, 24 can each have a plurality of features such as internal diameters 26, 28, 30, outer diameters 32, 34, planar surfaces 36, 38, gaps 40 between planar surfaces, etc. Such features can be defined by characteristics. For instance, an internal diameter 26, 28, 30 can be defined by an axis 42 position and orientation, a nominal diameter and tolerances, and a planar surface 36, 38 can be defined by a position and orientation, a perimeter, and tolerances. Such features, including characteristics, can be defined by designers at the design stage. Some features can have tighter tolerances which may require a stricter inspection schedule than others. In some embodiments, it can be advantageous for the designer to define characteristics of a feature independently from the characteristics of all other parts, whereas in other embodiments, it can be advantageous for the designer to define characteristics of a feature of a part relatively to characteristics of a feature of another part with which it is configured to be assembled to. It will be noted here for example that, an internal diameter feature 30 of the first part 22 is configured to receive an external diameter feature 34 of the second part 24, and the two are thus related to one another, for instance. Other examples of parts which can benefit from the description below can include turbine disks and integrated bladed rotors (IBRs).

Figure 3A:
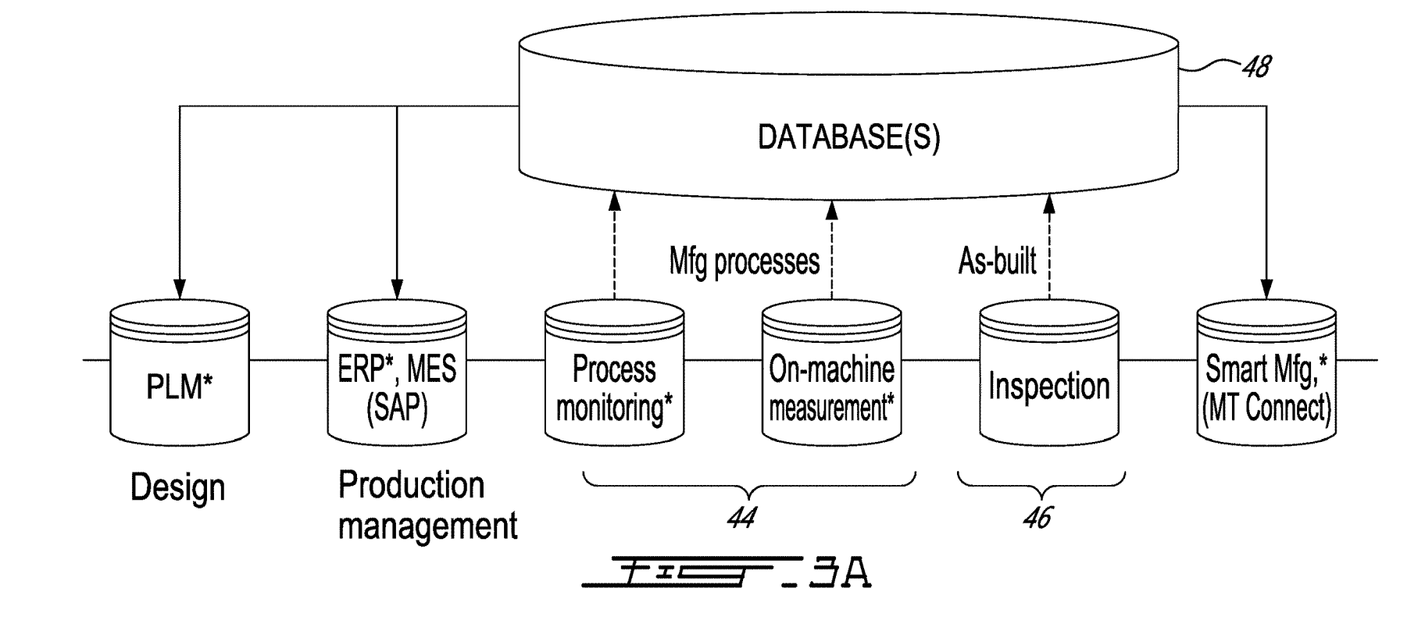
FIG. 3A is a schematic view of data flow in the context of manufacturing operations.
Figure 3B:
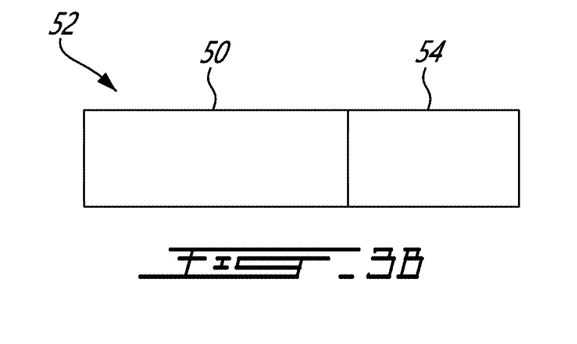
FIG. 3B is a schematic view of a first data item format.

As presented in FIG. 3A, computers associated with automated manufacturing processes such as Computer Numerical Control (CNC) machining 44 and Coordinate-Measuring Machine (CMM) inspection 46 can be enabled to perform computerized information collection leading to manufacturing data 50 which can be stored in a database 48. As represented in FIG. 3B, the manufacturing data 50 can be included as part of a data item 52 together with a identifier 54 of the part (PartID), in two corresponding fields of the data item 52. By including the partID 54 with the manufacturing data 50 in the data item 52, a query can be performed using the partID 54 in a manner to allow a user, such as a designer, production manager or software application, to retrieve information pertaining to the manufacturing of the part. Such a user may wish to access inspection data, for instance, to ascertain the degree at which targeted design tolerances are met in practice for the given part, or go even further and access data associated to a machining process. While organizing manufacturing data in this manner can be satisfactory to a certain degree, it will be understood that the user wishing to access the inspection data specific to a certain feature will need first to access the data for the part, and then find the data associated to the feature he is targeting amongst the other manufacturing data 50 associated to the part 22, which can be burdensome. Moreover, there may have been a limited number of that part 22 which has been actually manufactured, which may limit the amount of information available, and lead to correspondingly limited level of statistical representation for instance.

Occurrences of performing process steps on features could be significantly more common than occurrences performing manufacturing processes on a given part 22. Indeed, a same feature can be integrated to a large number of different parts 22, 24. For a feature realized by a same manufacturing process step, or a same sequence of manufacturing process steps, the manufacturing data may be equivalently relevant to a given intended use, independently of which part 22, 24 the feature is embodied in. However, using a manufacturing data storing process in which manufacturing data 50 is associated to corresponding PartIDs 54 may not allow a user to suitably easily retrieve relevant data about a given feature as it may exist in relation with other PartIDs, the user being limited to performing queries based on a pre-identified PartIDs.

Figure 3C:
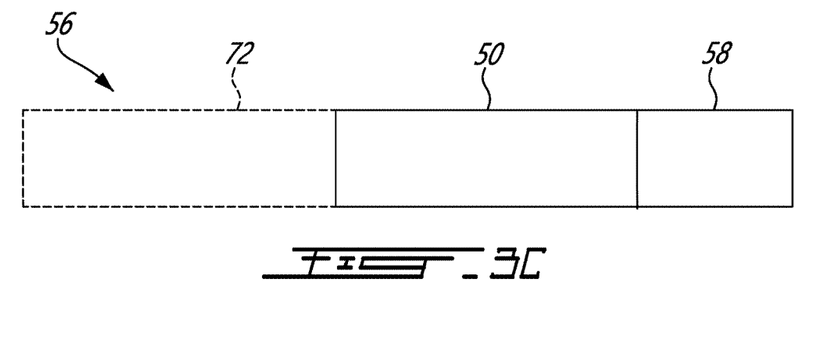
FIG. 3C is a schematic view of a second data item format.

In some embodiments, such inconveniences can be addressed by a different manufacturing data storage data item format, an example of which is presented in FIG. 3C, and in which manufacturing data 50 is stored not as a function of the PartID 54 of the part to which it pertains, but as a function of an identifier of a feature (FID) 58 to which it pertains.

Figure 4:
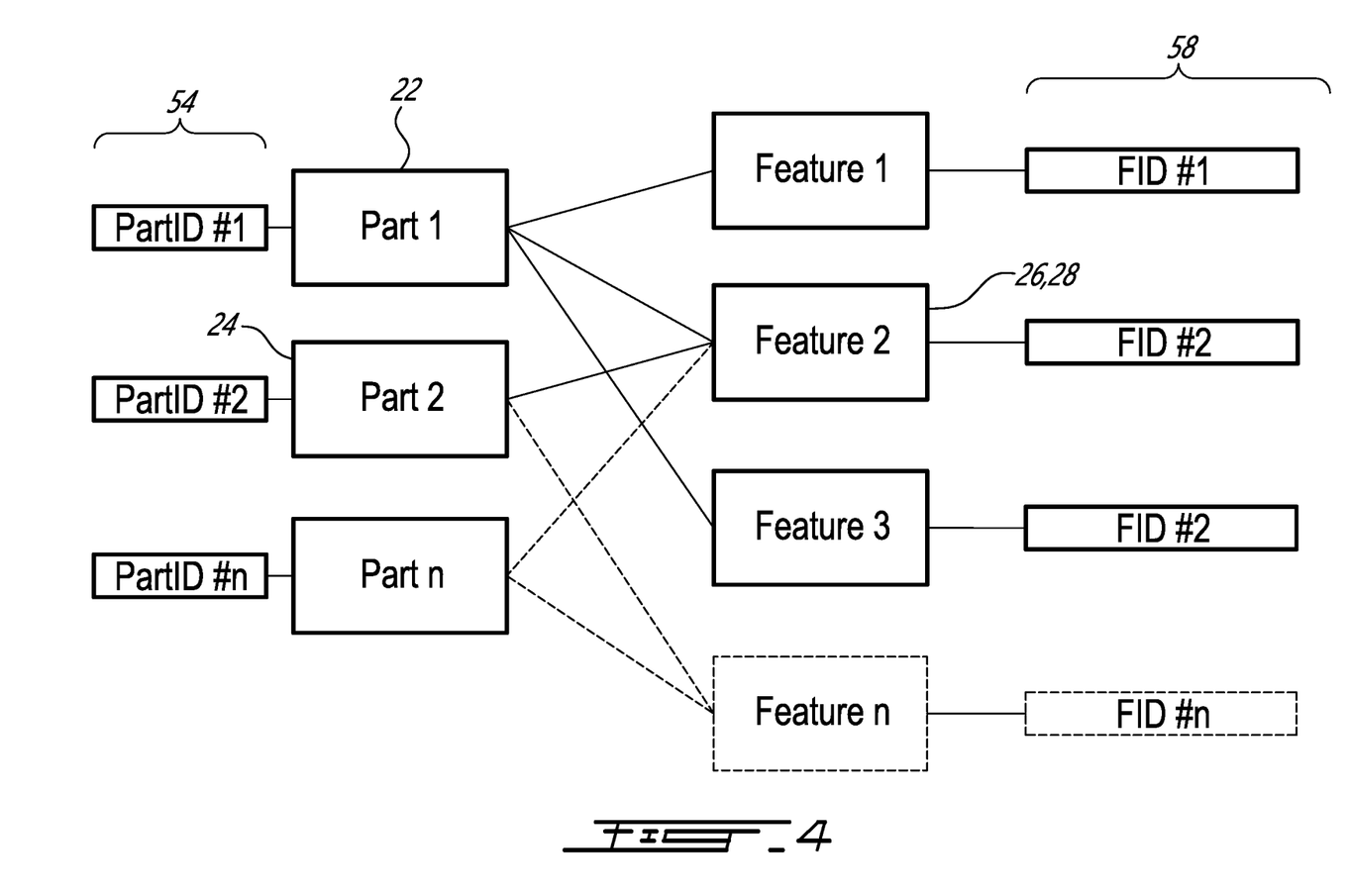
FIG. 4 is a schematic representation of the relationships between parts and features, and corresponding identifiers.

Let us turn to FIG. 4 to explain and define the relevant notions. As seen in this example, a plurality of parts can each have a corresponding combination of features. The features can be unique to a single part, or common to two or more of the parts. In this example, for instance, both Part 1 (e.g. part 22) and Part 2 (e.g. part 24) have Feature 2 (e.g. 26, 28). By contradistinction with associating identifiers (PartID #s) 54 to corresponding ones of the parts, which allows uniquely identifying a given part and distinguishing it from the other parts, feature identifiers (FID #s) 58 are associated here with corresponding features, which allow uniquely identifying a given feature and distinguishing it from the other features.

Feature identifiers (FIDs) 58 can be defined in accordance with a standard to allow different users to use a common "language" to refer to corresponding ones of a plurality of features. The standard used to define the feature identifiers can vary from one embodiment to another. In one embodiment, for instance, it may be decided to use the UUID format, in the context of the Quality Information Framework (QIF), as feature identifiers for corresponding feature definitions. In other embodiments, other standards can be used instead, while still allowing to group corresponding features independently of the part in which they are included.

Figure 5:
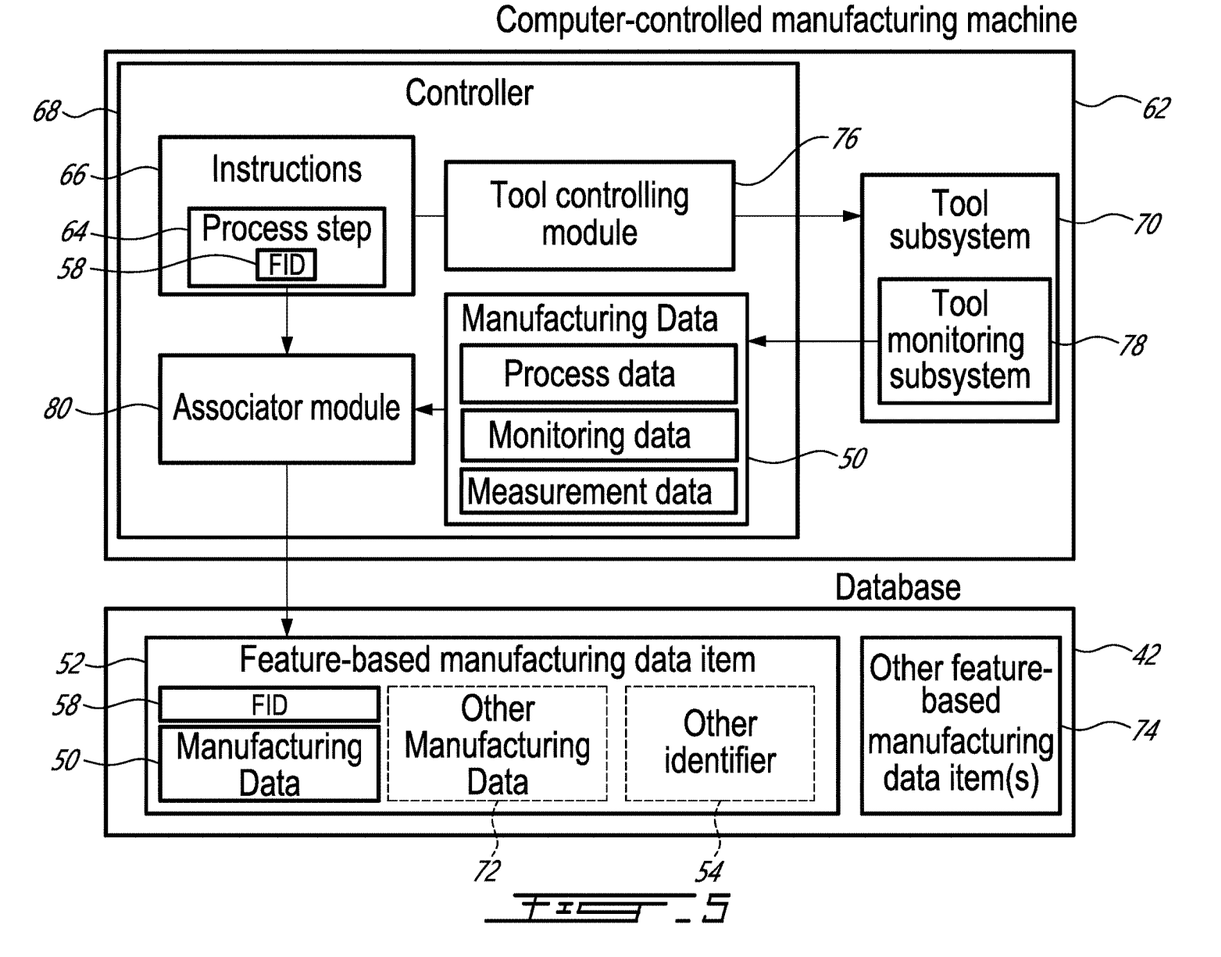
FIG. 5 is a block diagram of a manufacturing machine, in accordance with an embodiment.

Referring to FIG. 5, to harness pre-existing capabilities that computer-controlled manufacturing machines 62 such as CAM/CNC machining machines 44 or CMM(DCC) inspection machines 46 may have, FIDs 58 can be associated to a definition of corresponding process steps 64 in the computer readable instructions 66 (e.g. software code) which is provided to the manufacturing machine's computerized controller 68 to control the tooling subsystem 70. Based on the FID 58 associated with a given process step 64, the controller 68 can associate manufacturing data 50 provided by the manufacturing machine 62 for a given process step 64 with the FID 58 associated with that process step 64, and then proceed to store the manufacturing data 50 together with the FID 58 in a database 42 for subsequent access.

More specifically, the FID 58 and the manufacturing data 50 can be stored in corresponding fields of a single data item 52 in the database 42, in accordance with a configuration wherein the manufacturing data 50 can later be accessed using the FID 58 in a query. The data item 52, which may be referred to as a feature-based manufacturing data item 52, may or may not include other manufacturing data 72 (e.g. manufacturing data collected for another process step executed by a same or a different machine on the same instance of the feature) and may or may not include another identifier (e.g. a PartID 54). The database 42 can be embodied on computer readable memory which can be part of another computer than the controller 68, and the manufacturing machine 62 can communicate with the database 42 via a telecommunications network such as the Internet for instance. Other feature-based manufacturing data items 74 can be stored in the same database 42, and such other data items 74 can pertain to a plurality of different process steps performed by the same or by different machines, to a plurality of different occurrences of the same features, and to a plurality of different occurrences of a number of other features.

In the example presented in FIG. 5, different computerized functions are organized in corresponding boxes referred to as modules for simplicity. A tool controlling module 76 can be responsible for controlling the tooling subsystem 70, which can include a tool monitoring subsystem 78, in accordance with instructions 66 in the form of software code. The software code can be specific to a given part, for instance, and a number of different software codes associated to a corresponding number of parts can be stored in a memory of the controller 68 at a given time, with the software code being changed in accordance with production schedules. The tool controlling module 76 can have its own, lower layer, computer readable instructions which allow it to interpret the software code, select a software code corresponding to a given part, and control the tool subsystem accordingly to the instructions 66, and these computer readable instructions may be more permanent than the software code associated to the part, such as remaining the same until an eventual update is performed. An associator module 80 can be said to be responsible for performing the function of associating the manufacturing data 50 with the FID 58 and storing them together in the database 42.

Figure 6:
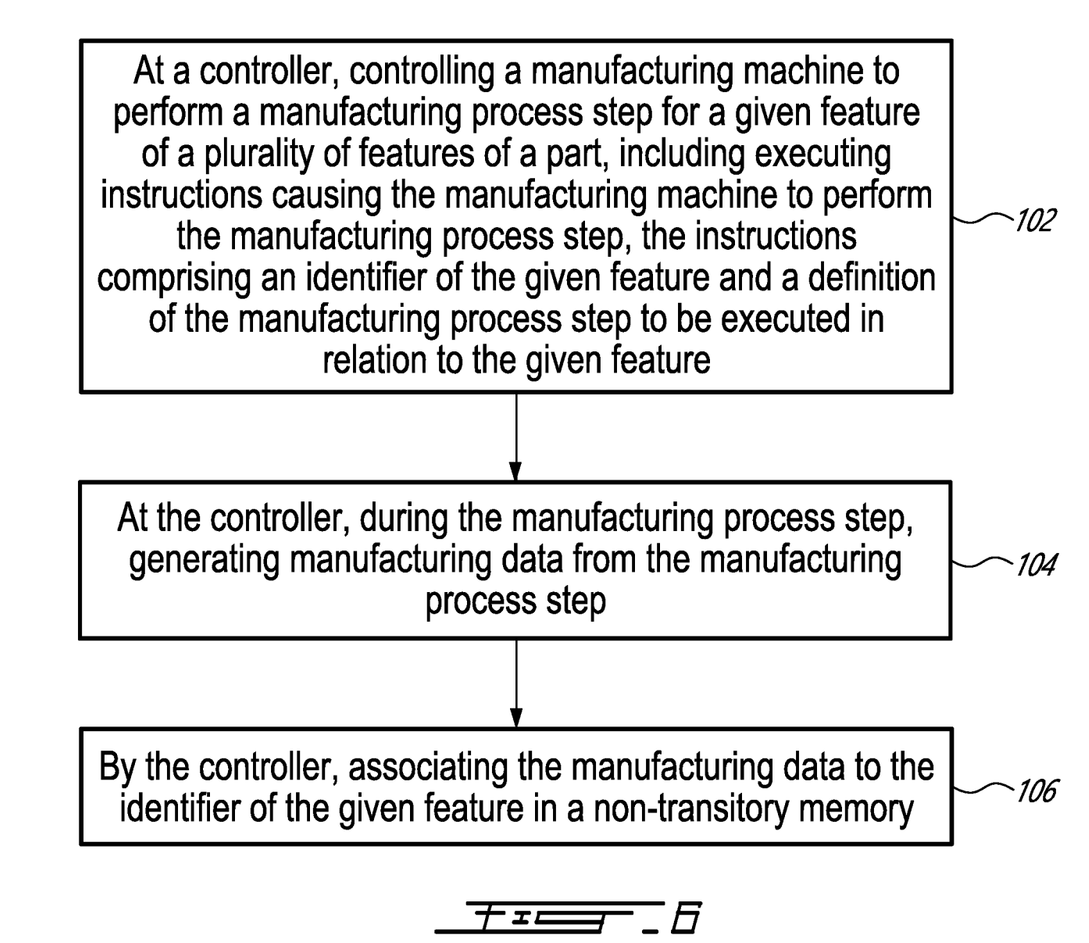
FIG. 6 is a flow chart of an example method of manufacturing a part, in accordance with an embodiment.

Accordingly, with reference to FIG. 6, in accordance with an embodiment, the controller can control 102 a tooling subsystem 70 of a manufacturing machine 62 to perform a manufacturing process step for a feature of the part in accordance with instructions 66, an identifier of the feature 58 being associated to a definition of the manufacturing process step 58 in the instructions 66; providing 102 manufacturing data 50 pertaining to the manufacturing process step 64; and storing 104 the manufacturing data 50 with the identifier of the feature 58 in a database 42.

In an example embodiment, the software code lists instructions 66 to perform a series of process steps 64 in a language which the tool controlling module 76 is designed to interpret. It can define process steps 64 in a manner for the tool controlling module 76 to be capable of interpreting which process step it is to perform, with which characteristics, and while more detailed instructions of how to execute a given process step with the corresponding characteristics can be included in the computer readable instructions of the tool controlling module 76. In one embodiment, for instance, the software code is expressed in the G-code language, which is a common software code used with manufacturing machines 62.

Figure 7:
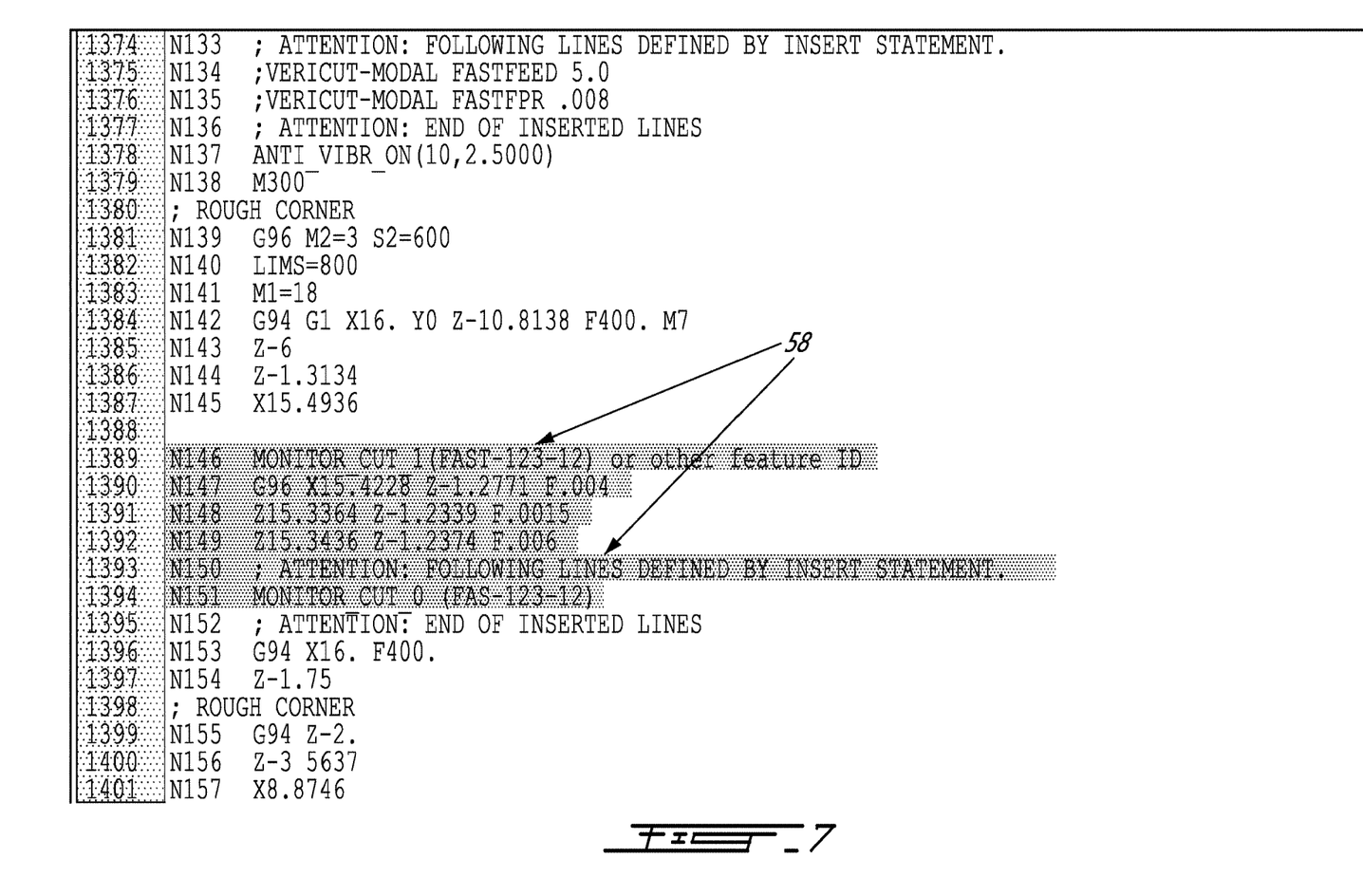
FIG. 7 is an excerpt of G-Code in accordance with an embodiment.

FIG. 7 presents an example portion of G-code in which a FID 58 which is associated with the definition of a process step 64, which is here a monitor cut process step for enabling the monitoring of the process and collecting process monitoring data with the FID. In another embodiment, the same FID can be added to the G-code to enable on-machine measurements or probing, for instance.

Manufacturing data 50 can be provided in various forms, the details of which can vary as a function of the embodiment. In one embodiment, manufacturing data can include measurement data. Measurement data can be collected by a tool monitoring subsystem of a CMM machine 46, for instance, or, in certain embodiments, by a tool monitoring subsystem included as part of a CNC machine 44 which is provided with some measurement capabilities. In such cases, the tool can be a probe. The measurement data can be collected by the manufacturing machine 62 while performing the corresponding process step 64 (e.g. a measurement step associated to the feature). FIG. 8 presents a visual representation of data items including both measurement data and FID 58. In the specific embodiment of FIG. 8, both probing data and CMM data are present with the Feature ID.

In an embodiment, manufacturing data 50 can include monitoring data. Indeed, a CNC machine 44, for instance, may be configured to collect measurements associated to a corresponding cutting process step. Such measurements can include one or more values of cutting/spindle load, coolant flow, temperature (e.g. spindle temperature), vibrations (e.g. amplitude and frequency spectrum). Indeed, if a user of feature-based manufacturing data items 52, 74 sees something unusual or particular about measurement data, he/she may wish to look into monitoring data in greater detail, for instance. The monitoring data can be collected by the manufacturing machine 62 while performing the process step (e.g. a cutting step such as a rough or finishing cutting step associated to the feature).

Figure 9:
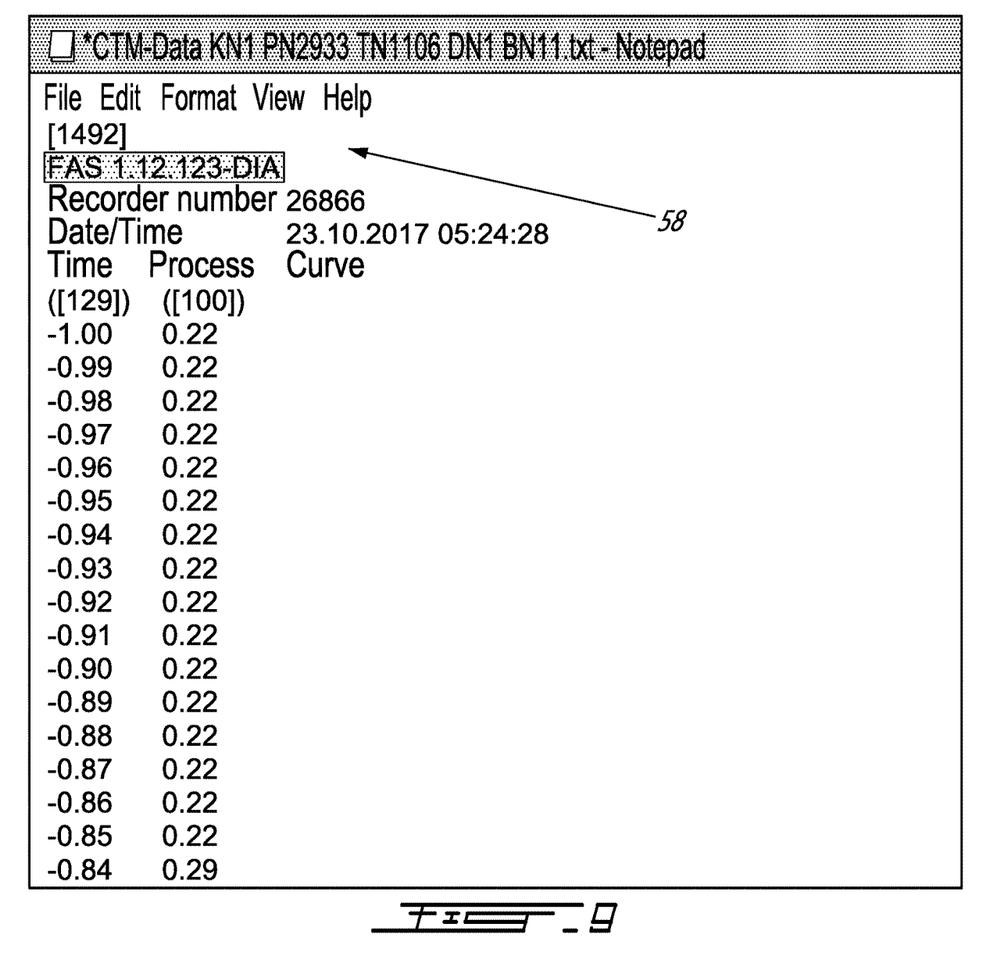
FIG. 9 is an example of data items in accordance with another embodiment.

In an embodiment, manufacturing data 50 can include process data. Process data can include internal data to the controller 68 for instance, such as offset values (e.g. internally applied correction following measurement or calibration), measurement or cutting time or duration values, etc. Indeed, if a user of feature-based manufacturing data items sees something unusual or particular about measurement data, he/she may wish to look into monitoring data in greater detail, for instance. The process data can be defined by the controller (e.g. tool controlling module), while performing the process step, or have been defined prior to the performing of the process step. FIG. 9 presents a visual representation of a data item including both process data and a FID.

In an embodiment, manufacturing data 50 can be collected by one or more machines 62 performing one or more process steps 64 associated to various occurrences of a given feature (e.g. 26, 28) on a plurality of parts (e.g. 22, 24) or on a plurality of occurrences of a given part, and be stored in a corresponding plurality of feature-based manufacturing data items 52, 74 in the database. Indeed, after performing a manufacturing process step on a first occurrence of a feature of a first part, leading to a first feature-based manufacturing data item 58 associated to a first occurrence of the feature, the manufacturing process step can be repeated on a second occurrence of the feature on a second part, leading to a second manufacturing data item 74 associated to the second occurrence of the feature in the database 42. Accordingly, if a search (query) is subsequently performed in the database on the basis of a FID 58 associated to the feature, the search can retrieve the first data item 52, the second data item 74, and any additional data item having manufacturing data 50 for the same feature.

In an embodiment, manufacturing data 50 can be collected by more than one machine (e.g. 44, 46) performing corresponding process steps (e.g. machining, measuring) on the same occurrence of a given feature, and the manufacturing data 50, 72 (see FIG. 3C) corresponding to each process step can be included in the same data item in the database. Indeed, after performing a first manufacturing step with a first manufacturing machine (e.g. a rough or finishing cutting step with a CNC machine) and producing an associated feature-based manufacturing data item 52 including first manufacturing data 50, a second manufacturing step with the first manufacturing machine (e.g. finishing cutting step), or with a second manufacturing machine (e.g. measurement with a CMM machine), can lead to second manufacturing data 72, and it can be convenient in some embodiments to insert this second manufacturing data 72 into the first data item 52, rather than creating another data item 74. For instance, the FID 58 can be included in a first field, the first manufacturing data 50 in a second field, and the second manufacturing data 72 in a third field of the data item 52, and so on. In such an embodiment, a search can then be performed by specifying a field identifier (e.g. identifier of the third field) in addition to a FID, and yield the manufacturing data 60 corresponding to the field identifier while not yielding the manufacturing data 50 not associated to that field identifier. In alternate embodiments, it can be preferred to create a new data item 74 with the additional manufacturing data 72.

Figure 10:
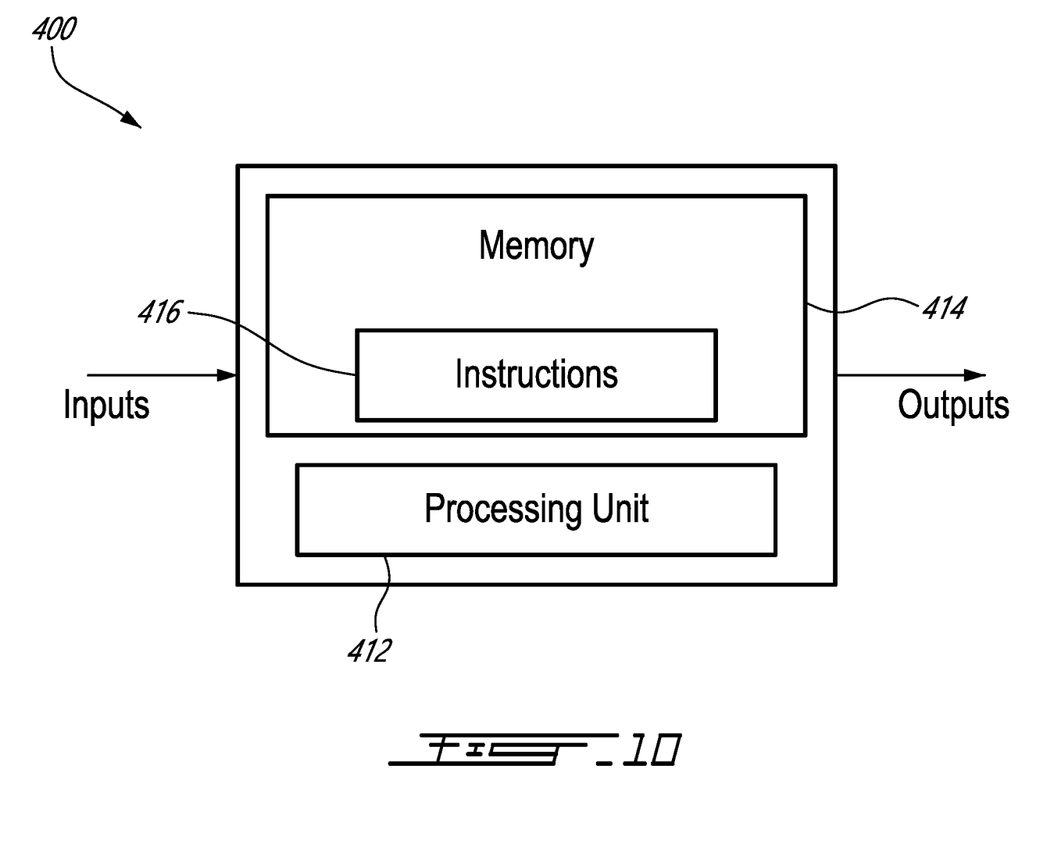
FIG. 10 is a block diagram of a computer.

Referring to FIG. 10, it will be understood that the expression "computer" 400 as used herein is not to be interpreted in a limiting manner. It is rather used in a broad sense to generally refer to the combination of some form of one or more processing units 412 and some form of memory system 414 accessible by the processing unit(s). The memory system can be of the non-transitory type. The use of the expression "computer" in its singular form as used herein includes within its scope one or more processing units working to perform a given function.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), an electronic engine controller EEC, a full authority digital engine controller (FADEC), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions. In the context of this specification, a computer or controller can be implemented in a cloud based, or virtual-machine based manner via software applications.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, various types of computer numerical controlled machines exist, such as mills, lathes, plasma cutters, electric discharge machines (EDM), multi-spindle machines, wire EDM, sinker EDM, water jet cutters, punch presses and 3D printing equipment. Moreover, the process can be applied to data collection systems such as process monitoring which are independent or not part of a CNC or CMM. Yet further modifications could be implemented by a person of ordinary skill in the art in view of the present disclosure, which modifications would be within the scope of the present technology.

The invention claimed is:

1. A computer-implemented method of controlling a computer numerical control (CNC) machine, the method comprising:
   at a controller, controlling the CNC machine to perform a first cutting process step for a given feature of a plurality of features of a first part having a first part identifier, including executing first instructions causing the CNC machine to perform the first cutting process step, the first instructions comprising a feature identifier of the given feature and a definition of the first cutting process step to be executed in relation to the given feature;
   at the controller, while controlling the CNC machine to perform the first cutting process step, controlling the CNC machine to acquire first monitoring data, including controlling the CNC machine to monitor the first cutting process step and to collect measurements associated to the first cutting process step, said first monitoring data including collected measurements of at least one of a cutting/spindle load, a coolant flow, a temperature, and vibrations;

by the controller, associating the first monitoring data to the feature identifier in a non-transitory memory;

performing a second cutting process step for the given feature on a second part in accordance with second instructions, the second part having a second part identifier distinct from the first part identifier, the feature identifier being associated to a definition of the second cutting process step in the second instructions;

generating second monitoring data pertaining to the second cutting process step; and associating the second monitoring data to the feature identifier in the non-transitory memory.

2. The method of claim 1 further comprising the controller generating a data element comprising the first monitoring data and the feature identifier associated with the first monitoring data.

3. The method of claim 1 wherein the associating the first monitoring data includes storing the first monitoring data and the feature identifier in corresponding fields of a first data item in the non-transitory memory, and associating the second monitoring data includes storing the second monitoring data and the feature identifier in corresponding fields of a second data item in the non-transitory memory.

4. The method of claim 1 further comprising performing a search in the non-transitory memory using the feature identifier, the search retrieving both the first monitoring data and the second monitoring data.

5. The method of claim 1 wherein the feature identifier is formatted in accordance with a universally unique identifier (UUID) format in accordance with quality information framework.

6. The method of claim 1 wherein said associating includes adding a data item to a database.

7. A computer numerical control (CNC) machine having a tooling subsystem and a controller configured to control the tooling subsystem, the controller having a processor and a non-transitory memory, the memory having stored thereon instructions operable to, when executed by the processor:

control the CNC machine to perform a first cutting process step for a given feature of a plurality of features of a first part having a first part identifier, the instructions comprising a feature identifier of the given feature and a definition of the first cutting process step to be performed in relation to the given feature;

while controlling the CNC machine to perform the first cutting process step, control the CNC machine to acquire first monitoring data, including controlling the CNC machine to monitor the first cutting process step and to collect measurements associated to the first cutting process step, said monitoring data including collected measurements of at least one of a cutting/spindle load, a coolant flow, a temperature, and vibrations;

associate the first monitoring data to the feature identifier in a non-transitory memory;

control the CNC machine to perform a second cutting process step for the given feature on a second part, the second part having a second part identifier distinct from the first part identifier, the feature identifier being associated to a definition of the second cutting process step;

while controlling the CNC machine to perform the second cutting process step, control the CNC machine to generate second monitoring data pertaining to the second cutting process step; and associate the second monitoring data to the feature identifier in the non-transitory memory.

8. A computer-implemented method of controlling a computer numerical control (CNC) machine, the method comprising:

at a controller, controlling the CNC machine to perform a cutting process step for a given feature of a plurality of features of a part, including executing first instructions causing the CNC machine to perform the cutting process step, the first instructions comprising a feature identifier of the given feature and a definition of the cutting process step to be executed in relation to the given feature, wherein the CNC machine is a first manufacturing machine and the cutting process step is a first machining step;

at the controller, while controlling the CNC machine to perform the cutting process step, controlling the CNC machine to acquire first monitoring data, including controlling the CNC machine to monitor the cutting process step and to collect measurements associated to the cutting process step, said first monitoring data including collected measurements of at least one of a cutting/spindle load, a coolant flow, a temperature, and vibrations;

by the controller, associating the first monitoring data to the feature identifier in a non-transitory memory;

controlling a tooling subsystem of a second manufacturing machine to perform a second manufacturing step for the given feature in accordance with second instructions, the second manufacturing step including a data measurement step, the feature identifier being associated to a definition of the second manufacturing step in the second instructions;

providing second monitoring data pertaining to the second manufacturing step;

storing the second monitoring data with the feature identifier in a non-transitory memory; and performing a search in the non-transitory memory using the feature identifier and an identifier of a field associated with the second monitoring data, the search retrieving the second monitoring data and not the first monitoring data.

9. The computer-implemented method of claim 8, wherein the first machining step and the second machining step are both performed on the part, wherein the storing includes storing the second monitoring data with the first monitoring data and the identifier in corresponding fields of a same data item in the non-transitory memory.

10. The computer-implemented method of claim 8, wherein the second manufacturing machine is a coordinate-measuring machine (CMM).

* * * * *